United States Patent [19]

Ushimaru et al.

[11] Patent Number: 4,612,235
[45] Date of Patent: Sep. 16, 1986

[54] MAGNETIC RECORDING MEDIUM

[75] Inventors: Akira Ushimaru; Masaaki Fujiyama; Toshimitu Okutu; Takahito Miyoshi, all of Odawara, Japan

[73] Assignee: Fuji Photo Film Co., Ltd., Kanagawa, Japan

[21] Appl. No.: 715,757

[22] Filed: Mar. 25, 1985

Related U.S. Application Data

[63] Continuation of Ser. No. 509,146, Jun. 29, 1983, abandoned.

[30] Foreign Application Priority Data

Jun. 29, 1982 [JP] Japan .................. 57-110691

[51] Int. Cl.$^4$ .................................. G11B 5/72
[52] U.S. Cl. .................................. 428/216; 427/128; 427/131; 360/134; 360/135; 360/136; 428/323; 428/328; 428/329; 428/330; 428/331; 428/694; 428/900
[58] Field of Search ............... 428/694, 695, 328, 329, 428/900, 323, 330, 331, 216; 427/131, 132, 128; 360/134–136

[56] References Cited

U.S. PATENT DOCUMENTS

| 4,189,514 | 2/1980 | Johnson | 428/447 |
| 4,367,261 | 1/1983 | Miyoshi | 428/694 |
| 4,427,738 | 1/1984 | Fujiyama | 428/323 |
| 4,452,863 | 6/1984 | Takizawa | 428/423.1 |
| 4,474,843 | 10/1984 | Miyoshi | 428/329 |

Primary Examiner—Ellis P. Robinson
Attorney, Agent, or Firm—Armstrong, Nikaido, Marmelstein & Kubovcik

[57] ABSTRACT

This invention relates to a magnetic recording medium whose coefficient of friction is lowered without lowering S/N and which has an improved running property, which comprises a magnetic recording layer on one side of a nonmagnetic support and a back layer containing an inorganic powder and a binder and having a thickness of at most 2$\mu$, on the other side thereof, characterized in that the surface of the back layer is provided with surface projections with a height of 0.05 to 0.8$\mu$, an interval of at least 50$\mu$ and 50 to 50,000 projections/cm$^2$.

5 Claims, No Drawings

MAGNETIC RECORDING MEDIUM

This application is a continuation of application Ser. No. 509,146 filed June 29, 1983, now abandoned.

BACKGROUND OF THE INVENTION

1. Field of the Invention

This invention relates to a magnetic recording medium and more particularly, it is concerned with an improved magnetic tape whose coefficient of friction is lowered without lowering S/N, which has an improved running durability and which is free from edge snick and scraping of the back surface.

2. Description of the Prior Art

Generally, in magnetic recording tapes for audio, video or computer, the surface of the magnetic recording layer is finished smooth so as to improve the sensitivity, in particular, output in high frequency range. However, such a smooth magnetic recording tape has a tendency that it is not taken up regularly during taking-up or rewinding, but it causes often disordered winding. The use of this magnetic tape meets with deterioration of the running property and fluctuation of the output due to tension fluctuation. In addition, this magnetic tape tends to be deformed or damaged. In order to overcome these disadvantages, there has been proposed a magnetic recording tape in which a back layer is provided on the reverse side of a support to a magnetic recording layer. However, the back layer used in the prior art should further be improved, because it often meets with scraping, increase of friction coefficient and folding of tape.

As well known in the art, when a back layer is provided for the purpose of improving the tape running property and running durability, the roughness of the back layer is transferred to the surface of a magnetic layer to degrade the surface property of the magnetic layer, thus deteriorating the electromagnetic property, in particular, S/N property of the magnetic recording medium, in a case where the magnetic recording medium, in particular, in the form of a tape is rolled up or stacked in the form of sheets. That is to say, deterioration of S/N property is due to that the roughness of the back layer is transferred to the surface of the magnetic layer when the magnetic recording medium is maintained or allowed to stand in rolled or stacked state, in which the surface state of the back layer is rough as a result of regarding the running property as important.

In order to overcome the above described disadvantages of the back layer, the inventors have proposed a magnetic recording medium in which a back layer is provided having spike grains with a height of 0.8 to 5$\mu$ and an interval of at least 200$\mu$ on the surface thereof and a friction coefficient of at least 0.25$\mu$ (U.S. Pat. No. 4,135,031). According to this prior art, the problems about the order of tape edges, tape loosening and step-out of edges of a wound tape can considerably be solved, but the problems about S/N property and durability remain unsolved.

SUMMARY OF THE INVENTION

It is an object of the present invention to provide a magnetic recording medium whose coefficient of friction is not increased and whose running durability is improved.

It is another object of the present invention to provide a magnetic recording medium having a back layer without deteriorating the S/N property.

These objects can be attained by a magnetic recording medium comprising a magnetic recording layer on one side of a non-magnetic support and a back layer containing an inorganic powder and a binder and having a thickness of at most 2$\mu$, on the other side thereof, characterized by providing on the surface of the back layer a surface roughness with a height of 0.05 to 0.8$\mu$, an interval of at least 50$\mu$ and 50 to 50,000 projections per cm$^2$.

DETAILED DESCRIPTION OF THE INVENTION

The inventors have made various efforts to develop a magnetic recording medium whereby the above described disadvantages can be overcome and consequently, have reached the present invention. That is to say, the present invention provides a magnetic recording medium comprising a magnetic recording layer on one side of a non-magnetic support and a back layer containing an inorganic powder and a binder and having a thickness of 2$\mu$ or less, characterized in that on the surface of the back layer are provided surface projections (roughness) with a height of 0.05 to 0.8$\mu$, preferably 0.05 to 0.5$\mu$, an interval of 50$\mu$ or more, preferably 50 to 300$\mu$ and 50 to 50,000/cm$^2$, preferably 2000 to 12,000, projections per cm$^2$.

The surface projections of the present invention can be formed by using inorganic powders, i.e. coarse grains and fine grains to be mixed. Useful examples of the inorganic powders are powders of carbon black, graphite, tungsten disulfide, molybdenum disulfide, boron nitride, $SiO_2$, $CaCO_3$, $Al_2O_3$, $Fe_2O_3$, $TiO_2$, $MgO$, $ZnO$ and $CaO$. The coarse grains and fine grains can be of a same inorganic material, but are preferably selected from different inorganic powders. In this case, the coarse grains are preferably of $Al_2O_3$, $MgO$, $ZnO$ or $CaO$, more preferably of $Al_2O_3$, and the fine grains are preferably of $SiO_2$, $CaCO_3$ or $TiO_2$, more preferably of $CaCO_3$.

Preferably, the coarse grains have a grain size of 0.1 to 1.5$\mu$, particularly, 0.1 to 1.1$\mu$ and the fine grains have a grain size of 50 to 1000 Å, particularly, 80 to 800 Å.

The binder which can be used in the present invention includes hitherto known thermoplastic resins, thermosetting resins and mixtures thereof.

Examples of the thermoplastic resin are vinyl chloride-vinyl acetate copolymer copolymers, vinyl chloride-vinylidene chloride copolymers, vinyl chloride-acrylonitrile copolymers, acrylic acid ester-acrylonitrile copolymers, acrylic acid ester-vinylidene chloride copolymers, acrylic acid ester-styrene copolymers, methacrylic acid ester-acrylonitrile copolymers, methacrylic acid ester-vinylidene chloride copolymers, methacrylic acid ester-styrene copolymers, urethane elastomers, polyvinyl fluoride, vinylidene chloride-acrylonitrile copolymers, butadiene-acrylonitrile copolymers, polyamide resins, polyvinyl butyral, cellulose resins such as cellulose acetate butyrate, cellulose diacetate, cellulose propionate and nitrocellulose, styrenebutadiene copolymers, polyester resins, chlorovinyl etheracrylic acid ester copolymers, amino resins and various rubber resins.

Examples of the thermosetting resin are phenol resins, epoxy resins, polyurethane hardening type resins, urea resins, melamine resins, alkyd resins, acrylic resins, polyisocyanates and polyamines.

The back layer of the present invention is so provided that the total thickness (magnetic layer+support+back layer) of the magnetic recording medium be as thin as possible, for the purpose of raising the recording density per unit volume. Thus, the thickness of the back layer is preferably 0.3 to $2\mu$, more preferably 0.5 to $1\mu$.

In the prior art, if the back layer is made thinner, the back layer tends to be broken. For example, when a magnetic recording medium is allowed to run, the back layer is readily scraped. On the contrary, the present invention is free from this disadvantage and in addition, the video S/N is not degraded even in high density recording such as of a recording wavelength of $1.3\mu$ by the use of the back layer of the present invention.

In the present invention, the magnetic recording layer can be provided in conventional manner as illustrated below.

Preparation of the magnetic recording layer is generally carried out by dispersing a ferromagnetic fine powder, additives such as dispersing agents, lubricants, abrasives, antistatic agents and the like and a binder in an organic solvent, coating the resulting magnetic coating composition onto a non-magnetic support and then drying. In this case, the commonly used ferromagnetic fine powders, additives, binders, organic solvents and non-magnetic supports can similarly be used.

As the binder, there can similarly be used thermoplastic resins and thermosetting resins as exemplified for the back layer.

Suitable materials which can be used for the non-magnetic support are various plastics, for example, polyesters such as polyethylene terephthalate, polyethylene-2, 6-naphthalate and the like; polyolefins such as polyethylene, polypropylene and the like; cellulose derivatives such as cellulose triacetate, cellulose diacetate, cellulose acetate butyrate, cellulose acetate propionate and the like; vinyl resins such as polyvinyl chloride, polyvinylidene chloride and the like; polycarbonates, polyimides and polyamide imides.

Useful examples of the ferromagnetic powders which can be used in the present invention are $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$ (FeOx: $1.33 < x < 1.50$), Co-doped Berthollide compounds of $\gamma$-$Fe_2O_3$ and $Fe_3O_4$ (FeOx: $1.33 < x < 1.50$), $CrO_2$, Co—Ni—P alloys, Co—Ni—Fe alloys, Co—Ni—Fe—B alloys, Fe—Ni—Zn alloys, Fe—Mn—Zn alloys, Fe—Co—Ni—P alloys and Ni—Co alloys, as described in Japanese Patent Publication Nos. 14090/1969, 18372/1979, 22062/1972, 22513/1972, 28466/1971, 38755/1971, 4286/1972, 12422/1972, 17284/1972, 18509/1972, 18573/1972, 10307/1964 and 39639/1973, U.S. Pat. Nos. 3,026,215, 3,031,341, 3,100,194, 3,242,005 and 3,389,014, British Pat. Nos. 752,659, 782,762 and 1,007,323, French Pat. No. 1,107,654 and West German OLS No. 1,281,334.

The ferromagnetic fine powders have a grain size of preferably about 0.2 to 1 $\mu$m in length with a length to width ratio of 1:1 to 20:1.

In these ferromagnetic iron oxides can be incorporated divalent metals such as Cr, Mn, Co, Ni, Cu and Zn in a proportion of 0 to 10 atom % based on the iron oxides. Moreover, the above described chromium dioxide $CrO_2$ contains 0 to 20% by weight of metals such as Na, K, Ti, V, Mn, Fe, Co, Ni, Te, Ru, Sn, Ce and Pb, semiconductors such as P, Sb and Te and oxides thereof.

Suitable dispersing agents are fatty acids containing about 12 to 18 carbon atoms represented by the general formula $R_1COOH$ wherein $R_1$ is an alkyl or alkenyl group containing 11 to 17 carbon atoms, for example, caprylic acid, capric acid, lauric acidd, myristic acid, palmitic acid, stearic acid, oleic acid, elaidic acid, linolic acid, linolenic acid, stearolic acid and the like; metallic soaps comprising the alkali metal (Li, Na, K, etc.) salts or the alkaline earth metal (Mg, Ca, Ba, etc.) salts of the above described fatty acids; fluorine compounds of the above described fatty acid esters; amides of the above described fatty acids; polyalkylene oxides alkylphosphoric acid esters; lecithin; and trialkyl polyolefin oxy quaternary ammonium salts, the alkyl group having 1-5 carbon atoms and the olefin being ethylene, propylene or the like. In addition, higher alcohols containing about 12 or more carbon atoms and sulfuric acid esters thereof. These dispersing agents are described in Japanese Patent Publication Nos. 28369/1964, 17945/1969 and 15001/1973 and U.S. Pat. Nos. 3,387,993 and 3,470,021.

Suitable lubricants which can be used in the present invention include silicone oils such as dialkylpolysiloxanes (alkyl: $C_1$-$C_5$), dialkoxypolysiloxanes (alkoxy: $C_1$-$C_4$), monoalkylmonoalkoxypolysiloxanes (alkyl: $C_1$-$C_5$; alkoxy: $C_1$-$C_4$), phenylpolysiloxanes and fluoroalkylpolysiloxanes (alkyl: $C_1$-$C_5$); electrically conductive fine powders such as graphite, inorganic fine powders such as molybdenum disulfide and tungsten disulfide; plastic fine powders such as polyethylene, polypropylene, polyethylene-vinyl chloride copolymers and polytetrafluoroethylene; $\alpha$-olefin polymers; unsaturated aliphatic hydrocarbons liquid at normal temperature ($\alpha$-olefin having double bond combined with terminal carbon, number of carbons about 20); fatty acid esters from monocarboxylic fatty acids of $C_{12}$-$C_{20}$ and monohydric alcohols of $C_3$-$C_{12}$; and fluorocarbons. These lubricants are described in Japanese Patent Publication Nos. 18064/1966, 23889/1968, 40461/1971, 15621/1972, 18482/1972, 28043/1972, 32001/1972 and 5042/1975, U.S. Pat. Nos. 3,470,021, 3,492,235, 3,497,411, 3,523,086, 3,625,760, 3,630,772, 3,634,253, 3,642,539 and 3,687,725, IBM Technical Disclosure Bulletin, Vol. 9, No. 7, page 779 (December 1966), and ELECTRONIK, No. 12, page 380 (1961), West Germany.

Typical abrasive agents which can be used in the present invention include fused alumina, silicon carbide, chromium oxide ($Cr_2O_3$), corundum, synthetic corundum, diamond, synthetic diamond, garnet, emergy (main components: corundum and magnetite) and the like. Examples of the abrasives are described in Japanese Patent Application No. 26749/1973, U.S. Pat. Nos. 3,007,807, 3,042,196, 3,293,066, 3,630,910, and 3,687,725, British Pat. No. 1,145,349, West German Pat. No. 853,211 and 1,001,000.

Antistatic agents which can be used in the present invention include electrically conductive powders such as graphite, carbon black and carbon black graft polymers; natural surface active agents such as saponin; nonionic surface active agents such as alkylene oxide based, glycerol based and glycidol based surface active agents; cationic surface active agents such as heterocyclic aompounds, e.g. pyridine and the like; higher alkylamines quaternary ammonium salts, phosphoniums, sulfoniums and the like; anionic surface active agents containing acid groups such as carboxylic acid groups, sulfonic acid groups, phosphoric acid groups, sulfate groups, phosphate groups and the like; amphoteric surface active agents such as sulfates or phosphates of amino acids, amino sulfonic acids, amino alcohols and the like; etc.

Examples of the surface active agents which can be used as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, West German Patent Application (OLS) No. 1,942,665, British Pat. Nos. 1,077,317 and 1,198,450, Ryohei Oda et al., "Kaimen Kassei Zai no Gosei to so no Oyo (Synthesis of Surface Active Agents and Their Applications), Maki Shoten, Tokyo (1964), A. M. Schwrats et al., "Surface Active Agents", Interscience Publications Corp., New York (1958), J. P. Sisley et al., "Encyclopedia of Surface Active Agents", Vol. 2, Chemical Publishing Co., New York (1964), "Kaiman Kassei Zai Binran (Handbook of Surface Active Agents)", 6th Ed., Sangyo Tosho Co., Tokyo (Dec. 20, 1966), etc.

These surface active agents can be used individually or in combination with each other. These surface active agents are generally used as antistatic agents, but in some cases, they are used for other purposes, for example, for improving dispersibility, magnetic properties and lubricity, or as an auxiliary coating agent.

The above described magnetic powder, binder dispersing agent, lubricant, abrasive agent, antistatic agent and solvent are well blended or kneaded to prepare a coating composition. For kneading, the magnetic powder and other components are charged in a kneading machine simultaneously or separately. For example, a magnetic powder is added to a solvent containing a dispersing agent, kneaded for a predetermined period of time, then mixed with other components and kneaded sufficiently to prepare a magnetic coating composition. Various kneading machines are used for the kneading and dispersing for example, two roll mills, three roll mills, ball mills, pebble mills, trommel mills, sand grinders, Szegvari attriters, high speed impeller dispersing machines, high speed stone mills, high speed impact mills, kneaders, high speed mixers, homogenizers, ultrasonic dispersing machines, etc. The kneading and dispersing techniques are described in T. C. Patton, "Pain Flow and Pigment Dispersion", published by John Wiley & Sons (1964) and U.S. Pat. Nos. 2,581,414 and 2,855,156.

Typical organic solvents which can be used in the coating include ketones such as acetone, methyl ethyl ketone, methyl isobutyl ketone, cyclohexanone and the like; esters such as methyl acetate, ethyl acetate, butyl acetate, ethyl lactate, glycol monoethyl ether acetate and the like; aromatic hydrocarbons such as benzene, toluene, xylene and the like; and chlorinated hydrocarbons such as methylene chloride, ethylene chloride, carbon tetrachloride, chloroform, ethylene chlorohydrin, dichlorobenzene and the like.

The amounts of the above described components to be used as follows: The proportion by weight of a ferromagnetic fine powder and binder is generally 100:13-50, preferably 100:17-40. The quantity of a solvent is 3-5 times as much as a ferromagnetic fine powder. To 100 parts by weight of a binder there are used 0.5-20 parts by weight of a dispersing agent, 0.2-20 parts by weight of a lubricant, 0.5-20 parts by weight of an abrasive agent, 0.2-50 parts by weight of an electrically conductive fine powder as antistatic agent and 0-3 parts by weight of a surface active agent as antistatic agent.

The above described ferromagnetic fine powder, binder, dispersing agent, lubricant, abrasive antistatic agent and solvent are well blended to prepare a magnetic coating composition and then coated onto a nonmagnetic support using coating methods such as air doctor coating, blade coating, air knife coating, squeeze coating, dip coaing, reverse roll coating, transfer roll coating, gravure coating, kiss coating, cast coating, spray coating and the like, and other coating methods can also be used. These coating methods are described in, for example, "Coating Kogaku (Coating Engineering)", page 253 to 277, published by Asakura Shoten, Tokyo (Mar. 20, 1971). The coating thickness is generally 1 to 18 $\mu$m on dry basis depending on the use, shape (film, tape, sheet, etc.) and standard of the magnetic recording medium.

The drying temperature and time depends on the variety of a solvent, its quantity in the coating composition and its residual quantity. In general, the drying temperature is 40° to 100° C. and is gradually raised with the progress of drying, while the drying time is about 5 second to 3 minutes.

After drying, the magnetic recording medium can once be rolled up, but it is preferably subjected to a calendering treatment without rolling up in order to increase the S/N ratio. The calendering treatment can be carried out in known manner, for example, by the supercalendering method comprising passing through a metal roll and a cotton roll or synthetic resin roll (nylon, epoxy resin, polyurethane resin, etc.), or a metal roll and a metal roll.

The conditions of this calendering treatment are suitably adjusted depending on the variety of a tape and are generally within the following ranges: nip pressure of calendering rolls (linear pressure): 80-300 Kg/cm, preferably 100-240 Kg/cm; tape transporting speed: 30-200 m/min, preferably 60-150 m/min; and roll temperature: 25°-120° C., preferably 45°-80° C. If the nip pressure is less than 80 Kg/cm, smoothening of the surface of the magnetic layer is not sufficient, while if more than 300 Kg/cm, the life of calendering rolls is short and this is disadvantageous from an economical point of view. If the roll temperature is lower than 25° C., smoothening of the surface of the magnetic layer is not sufficient and if higher than 120° C., the life of calendering rolls is short and this is disadvantageous from an economical point of view.

The present invention will be explained in detail with reference to the following examples. It will be obvious to one skilled in the art that various changes and modifications can be made in components, ratios, operational order and the like without departing from the spirit of the present invention. Therefore, the present invention should not be construed as being limited to the following examples. All parts used herein are to be taken as those by weight unless otherwise indicated.

EXAMPLE

A magnetic layer containing Co-doped $\gamma$-$Fe_2O_3$ was formed on the surface of a polyethylene terephthalate base with a thickness of 14$\mu$, while a back layer was formed on the other side thereof. The magnetic layer was coated to give a coating thickness of 5$\mu$ on dry base and the back layer was coated to give a coating thickness of $0.7\mu$ using the following composition with changing the combination of inorganic powders:

| | |
|---|---|
| Nitrocellulose | 25 parts |
| Polyurethane (commercial name: Nippollan 2301 made by Nippon Polyurethane KK) | 15 parts |
| Polyisocyanate (commercial name: Colonate L made by Nippon Polyurethane KK) | 40 parts |
| Fine Grain Inorganic Powder (CaCO$_3$, mean grain size: $0.07\mu$) | 100 parts |
| Coarse Grain Inorganic Powder ($\alpha$-Al$_2$O$_3$, mean grain size: shown in Table 1) | variable as shown in Table 1 |
| Methyl Ethyl Ketone | 480 parts |

As to each sample of the above described magnetic recording tapes, the following various tests were carried out to obtain results tabulated below.

TEST METHOD 1

Running durability was examined as to a virgin tape and that after 100 passes by measuring the inlet tension ($T_1$) and outlet tension ($T_2$) round a revolving cylinder in a VHS video deck.

Moreover, output fluctuation was examined as to a virgin tape and that after 100 passes.

TEST METHOD 2

Using a virgin tape and that after 100 passes, the dynamical friction coefficient (3.3 cm/sec) $T_2/T_1$ of a stainless pole was examined on the sides of the magnetic layer and back layer.

TEST METHOD 3

The abrasion state of the back coating surface and the damaged state of the tape were examined after 100 passes through a VHS video deck.

free comparative example (Sample No. 1). Thus, an interval of $50-300\mu$ is preferable.

When the number of surface projections are less than 50/cm$^2$, the output fluctuation of 100 pass tape and the friction coefficient are large and the abrasion or damage of the tape is remarkable as in the case of Sample Nos. 1 and 2, while when it is larger than 50000/cm$^2$, the output fluctuation of 100 pass tape is large as in the case of Sample No. 6. Thus, 50–50000 projections/cm$^2$ are preferable and 2000–12000 projections/cm$^2$ are more preferable.

When the height of surface projection is about $0.05\mu$ (Sample No. 7) or about $0.8\mu$ (Sample No. 10), the output fluctuation of 100 pass tape, abrasion state and damaged state tend to be increased. Thus, a height of $0.05-0.8\mu$, particularly $0.1-0.5\mu$ is preferable.

In a magnetic recording tape with a thin back layer, therefore, a higher running durability, i.e. less scraping of the back layer and improved S/N property can be obtained by the use of a combination of coarse grains and fine grains as a filler for the back layer and by providing surface projections as specified in Claims on the surface of the back layer. The back layer of the present invention is most suitable for use as a back layer in the latest ½ inch video tapes, metal video tapes and vapor deposition video tapes.

What is claimed is:

1. A magnetic recording medium comprising a magnetic recording layer on one side of a non-magnetic support and, on the other side thereof, a back layer having a maximum thickness of $2\mu$, and containing inorganic powder selected from at least one member of the following group: carbon black, graphite, tungsten disulfide, molybdenum disulfide, boron nitride, SiO$_2$, CaCO$_3$, Al$_2$O$_3$, Fe$_2$O$_3$, TiO$_2$, MgO, AnO, CaO, in a

TABLE 1

| Properties | Sample No. | | | | | | | | | |
|---|---|---|---|---|---|---|---|---|---|---|
| | 1 | 2 | 3 | 4 | 5 | 6 | 7 | 8 | 9 | 10 |
| Coarse Grain Inorganic Powder | | | | | | | | | | |
| Mean Grain Size ($\mu$) | — | 0.8 | 0.8 | 0.8 | 0.8 | 0.8 | 0.2 | 0.4 | 1.1 | 1.5 |
| Part by Weight | 0 | 0.001 | 0.1 | 0.25 | 1.8 | 10 | 0.25 | 0.25 | 0.25 | 0.25 |
| Surface Projections | | | | | | | | | | |
| Number/cm$^2$ | — | 20 | 2000 | 12000 | 50000 | >50000 | 12000 | 12000 | 12000 | 12000 |
| Pitch ($\mu$) | — | 1500–3000 | 150–300 | 50–150 | 50* | less than 50 | 50–150 | 50–150 | 50–150 | 50–150 |
| Height ($\mu$) | — | 0.2 | 0.2 | 0.2 | 0.2 | — | 0.05 | 0.1 | 0.5 | 0.8 |
| Output Fluctuation of 100 Pass Tape | 0.8 | 0.8 | less than 0.1 | less than 0.1 | 0.8 | 1.4 | 0.6 | 0.1 | 0.6 | 0.8 |
| Deck Tension ($T_2/T_1$) | | | | | | | | | | |
| Virgin Tape | 100/40 | 100/40 | 80/35 | 75/35 | 70/35 | 70/35 | 90/35 | 80/35 | 75/35 | 75/35 |
| 100 Pass Tape | 95/35 | 95/35 | 75/35 | 70/35 | 65/35 | 65/35 | 85/35 | 75/35 | 70/35 | 95/35 |
| Friction Coefficient | | | | | | | | | | |
| Virgin Tape | | | | | | | | | | |
| Magnetic Surface | 2.9 | 2.9 | 2.6 | 2.6 | 2.6 | 2.5 | 2.9 | 2.6 | 2.6 | 2.6 |
| Back Surface | 2.1 | 2.0 | 1.7 | 1.6 | 1.6 | 1.6 | 2.0 | 1.6 | 1.6 | 1.6 |
| 100 Pass Tape | | | | | | | | | | |
| Magnetic Surface | 2.8 | 2.7 | 2.5 | 2.5 | 2.5 | 2.4 | 2.7 | 2.5 | 2.5 | 2.5 |
| Back Surface | 2.2 | 2.0 | 1.9 | 1.7 | 1.7 | 1.7 | 1.9 | 1.7 | 1.7 | 1.9 |
| Abrasion State of Tape after 100 Passes | much | little | very little | very little | very little | very little | little | very little | very little | much |
| Damaged State of Tape (Foldings, Scratches) | little | little | very little | very little | very little | very little | little | very little | very little | little |

Note: *mean value

The following matters will be apparent from Table 1.

When the interval of surface projections on the back layer is less than $50\mu$ (Sample No. 6), the output fluctuation of 100 pass tape is large, which is not favourable, while when it is 1500–3000 (Sample No. 2), the properties are substantially similar to those of the roughness-free comparative example (Sample No. 1). Thus, an combination of fine grains of 50 to 1000 Å and coarse grains of 0.1 to $1.5\mu$, so as to form, on the surface of the back layer, surface projections with a height of 0.1 to $0.5\mu$, an interval of 50 to $300\mu$ and 2,000 to 12,000 projections/cm$^2$.

2. The magnetic recording medium of claim 1, wherein the coarse grains consist of at least one member selected from the group consisting of alumina, magnesium oxide, zinc oxide and calcium oxide.

3. The magnetic recording medium of claim 1, wherein the fine grains consist of at least one member selected from the group consisting of silica, calcium carbonate and titanium dioxide.

4. The magnetic recording medium of claim 1, wherein the binder consists of at least one member selected from the group consisting of thermoplastic resins and thermosetting resins.

5. The magnetic recording medium of claim 1, wherein the non-magnetic support has a thickness of 3 to $100\mu$.

* * * * *